United States Patent
Yoshihara et al.

(10) Patent No.: US 6,811,862 B2
(45) Date of Patent: Nov. 2, 2004

(54) SLIDE FASTENER

(75) Inventors: Nori Yoshihara, Otsu (JP); Akira Taniguchi, Otsu (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 10/268,659

(22) Filed: Oct. 11, 2002

(65) Prior Publication Data

US 2003/0152762 A1 Aug. 14, 2003

(30) Foreign Application Priority Data

Oct. 31, 2001 (JP) .......................................... 2001-335263
Jun. 21, 2002 (JP) .......................................... 2002-181971

(51) Int. Cl.[7] .............................................. B32B 27/12
(52) U.S. Cl. .................................. 428/297.4; 428/299.1; 428/299.4; 24/381; 24/385; 24/415; 525/165; 525/444
(58) Field of Search .................... 428/297.4, 299.1, 428/299.4; 24/381, 385, 415; 525/165, 444

(56) References Cited

U.S. PATENT DOCUMENTS

| 5,500,276 A | 3/1996 | Sawada et al. |
| 6,383,622 B1 * | 5/2002 | Ishibashi et al. ......... 428/299.1 |
| 2002/0051874 A1 | 5/2002 | Ishibashi et al. |

FOREIGN PATENT DOCUMENTS

| EP | 0632974 A1 | 1/1995 |
| EP | 0862869 A2 | 9/1998 |
| JP | A 7-23811 | 1/1995 |
| JP | A 10-243805 | 9/1998 |
| JP | A 2000-7924 | 1/2000 |

* cited by examiner

*Primary Examiner*—Merrick Dixon
(74) *Attorney, Agent, or Firm*—Kenyon & Kenyon

(57) ABSTRACT

The present invention provides a resin composition for a slide fastener. In one embodiment, upon setting, the resin composition does not melt even upon contact with a hot surface. In addition, the fastener provides low sliding resistance or friction, as well as durability and structural strength to withstand repeated opening and closing operations. Finally, the fastener can be dyed with cloth in the same bath.

18 Claims, 2 Drawing Sheets

SLIDE FASTENER

BACKGROUND OF THE INVENTION

1. Field of the Invention

The present invention relates to a resin composition used in the forming of a slide fastener, and more specifically to a resin composition used in the forming of a slide fastener that is attached to clothing, a bag or the like, and can be used even subjected repeatedly to washing, drying by heating, or the heat from an iron. Moreover, the present invention also relates to a slider and elements for constituting a slide fastener, and methods of manufacturing the slider and the elements.

2. Description of the Related Art

In general, as shown in FIG. 1, a slide fastener is constituted from elements 1 (also referred to as. 'teeth'), fastener tapes 2, a slider (an opening/closing member consisting of a slider body 3 and a tab 4), a bottom stopper 5, and if necessary a top stopper (not shown); by moving the slider, the elements engage with one another and hence the tapes close together, or the elements come away from one another and hence the tapes open apart.

Conventionally, a metal having high strength, polyoxymethylene having good moldability and wear resistance, or the like is used for the elements and the slider. However, elements and sliders made of a metal or polyoxymethylene have poor dyeability and thus cannot be dyed as with cloth or the above-mentioned fastener tapes, and hence conventionally have been used after coloring in advance using a pigment. Moreover, elements and sliders made of polyoxymethylene have a problem of melting upon contact with an iron during ironing.

Furthermore, polybutylene terephthalate has sometimes been used for elements and sliders, but in this case as well the dyeability differs greatly to that of cloth or the above-mentioned fastener tapes and thus the color tones do not match, and hence it is necessary to carry out coloring using a pigment before molding, or else carry out dyeing separately to the cloth after molding; use has thus not become widespread. Moreover, with elements and sliders made of a non-reinforced polybutylene terephthalate resin, there is a problem that the rigidity is low, with the flexural modulus of elasticity being approximately 2.3 Gpa, and hence deformation occurs during opening and closing. Furthermore, with elements and sliders made of reinforced polybutylene terephthalate, in particular in the case that the content of a fibrous reinforcing material is more than 20 wt %, the amount of warping and deformation becomes large, and hence in connection with the dimensional accuracy, the opening/closing resistance is high and there is much partial cracking and wear; uses have thus been extremely limited. Attempts have been made to reduce the opening/closing resistance by mixing in a sliding ability improving agent, but the improvement has not been sufficient. The use of polyethylene terephthalate has also been tried, but with an ordinary composition, molding has been difficult with a complex mold, and hence it has not been possible to achieve sufficient productivity. Moreover, in the case of fastener components for which high dimensional accuracy is required, there have been problems with opening and closing during use due to deformation of the product during release from the mold.

SUMMARY OF THE INVENTION

The present inventors carried out extensive studies to resolve the above problems, and eventually accomplished the present invention.

The present invention provides a resin composition for a slide fastener according to which, when formed into a constituent component of a slide fastener, the resin composition does not melt even upon contact with an iron, slider opening/closing resistance is low, and the resin composition has high durability and sufficient strength to withstand opening and closing Moreover, the present invention provides a resin composition for slide fastener elements according to which, when formed into a slide fastener, even when dyed in the same bath as cloth the difference in color tone between the resin composition and the cloth is low, and hence dyeing in the same bath as cloth is possible.

Furthermore, the present invention provides a slider and elements each made of a resin composition for slide fasteners as described above, and a method of manufacturing the slider and the elements.

Specifically, the present invention provides resin compositions for a slide fastener, a slide fastener, a slider, elements, and a method of manufacturing the slider and the elements as follows.

1. A resin composition for a slide fastener, comprising undermentioned component (A); and at least one component selected from the group consisting of undermentioned components (B), (C), (D) and (E):

(A) a polyester resin having at least 80 mol % of an alkylene terephthalate repeat unit;

(B) a polymer having a mean dispersed particle diameter dispersed in a range of 0.01 to 3 microns and having a glass transition temperature of not more than 0° C.;

(C) at least one inorganic compound selected from the group consisting of titanium compounds, zinc compounds, and silicon compounds;

(D) a fibrous reinforcing material;

(E) at least one mold release agent selected from the group consisting of silicone compounds, higher fatty acid ester compounds, and higher fatty acid salt compounds.

2. The resin composition for a slide fastener according to claim 1, wherein said alkylene terephthalate repeat unit is an ethylene terephthalate repeat unit.

3. The resin composition for a slide fastener according to claim 1 or 2, comprising 100 parts by weight of said (A), 1 to 30 parts by weight of said (B), and 0.1 to 10 parts by weight of said (C).

4. The resin composition for a slide fastener according to claim 1 or 2, comprising said (A), said (D) and said (E), and having a flexural modulus of elasticity of at least 2.6 GPa at 23° C.

5. The resin composition for a slide fastener according to claim 4, comprising 100 parts by weight of said (A), 0.1 to 200 parts by weight of said (D), and 0.1 to 10 parts by weight of said (E).

6. A slider made of the resin composition according to any of claims 1 to 5.

7. A slider made of the resin composition according to claim 4 or 5.

8. A element made of the resin composition according to any of claims 1 to 5.

9. A element made of the resin composition according to claim 3.

10. A slide fastener comprising the slider according to claim 6 or 7 or the elements according to claim 8 or 9.

11. A slide fastener comprising the slider according to claim 6 or 7 and the elements according to claim 8 or 9.

12. A method of manufacturing a slider, comprising the step of molding the resin composition according to any of Items 1 to 5.

13. A method of manufacturing a slider, comprising the step of molding the resin composition according to Item 4 or 5.

14. A method of manufacturing an element, comprising the step of molding the resin composition according to any of Items 1 to 5.

15. A method of manufacturing an element, comprising the step of molding the resin composition according to Item 3.

Following is a description of embodiments of the resin composition for the slide fastener, the slide fastener, the slider, the element, and the method of manufacturing the slider and the element, according to the present invention.

In the present invention, examples of a glycol component of the polyester resin (A) having at least 80 mol % of an alkylene terephthalate repeat unit include ethylene glycol, 1,3-propylene glycol, butanediol, neopentyl glycol, cyclohexanedimethanol, diethylene glycol, polyethylene glycol, polytetramethylene glycol, and polylactone. Examples of the polyester resin (A) include, polyethylene terephthalate, polybutylene terephthalate, polypropylene terephthalate, and copolymers thereof. Of these, polyethylene terephthalate and copolymers thereof are preferable, due to having high strength and rigidity, having similar material properties to cloth materials, and being the easiest to handle. It is undesirable for the alkylene terephthalate repeat unit content to be less than 80 mol %, since then the moldability and the rigidity will drop.

Moreover, it is also possible to use a recycled material (e.g. recycled pellets) from bottles, films, textiles or the like as the polyester resin (A). The use of a recycled material is preferable from the perspective of social demands to promote a circulatory society. For example, it is possible to re-pelletize clothing consisting of polyester fibers and polyester slide fasteners to manufacture recycled pellets, and then manufacture the polyester slide fastener of the present invention using these recycled pellets as a raw material. Flakes made by pulverizing the recycled material, pellets made by melting such flakes using an extruder, and so on can be used, with there being no limitations on the form.

In the present invention, a polymer (B) that has a mean dispersed particle diameter dispersed in a range of 0.01 to 3 microns and has a glass transition temperature of not more than 0° C. is used. Here, the value of the mean dispersed particle diameter means the value obtained by a method in which an image or photograph taken of the fracture section of a molded article of the resin composition is analyzed using a scanning electron microscope, and then the diameter corresponding to a circle as the area (the Heywood diameter) is calculated.

Examples of the polymer (B) that has a mean dispersed particle diameter dispersed in a range of 0.01 to 3 microns and has a glass transition temperature of not more than 0° C. include polyolefin type polymers, acrylic type polymers, polyester type polymers, butadiene type polymers, and urethane type polymers. Of these, polyolefin type polymers, polyester type polymers, and acrylic type polymers are preferable.

Specifically, examples of polyolefin type polymers include polyethylene, polypropylene, polybutene, ethylene/propylene copolymers, ethylene/α-olefin copolymers, ethylene/ethylacrylate copolymers, ethylene/methyl methacrylate copolymers, and ethylene/vinyl acetate copolymers, and also acrylic-acid-modified forms thereof, maleic-anhydride-modified forms thereof, and epoxy-modified forms thereof. Of these, acrylic acid copolymers, maleic-anhydride-modified forms, and epoxy-modified forms are preferable, with maleic-anhydride-modified forms of polyolefins and epoxy-modified forms of polyolefins being particularly preferable, and the combined use of a maleic-anhydride-modified form of a polyolefin and an epoxy-modified form of a polyolefin further being preferable.

Moreover, as a polyester type polymer, a polyether/polyester block copolymer, a polyester/polyester block copolymer or the like is used. Examples include polytetramethylene glycol/polybutylene terephthalate copolymers, polypropylene glycol/polybutylene terephthalate copolymers, polyethylene glycol/polybutylene terephthalate copolymers, and polylactone/polybutylene terephthalate copolymers.

Moreover, as an acrylic type polymer, an alkyl acrylate/alkyl methacrylate block polymer, an alkyl acrylate/alkyl methacrylate/styrene copolymer or the like is used. As the alkyl groups, methyl, ethyl, butyl and so on are preferable. Moreover, polymers in which carboxyl groups, epoxy groups, silanol groups, or siloxane groups have been introduced into the above are preferable, since the dispersed particle diameter can easily be adjusted. Moreover, powdered rubbers of the above that have been made into a core/shell type are preferable, since the adjustability of the dispersed particle diameter and the handleability to adjust the dispersed particle diameter are good.

In the present invention, the dispersed particle diameter of the polymer (B) is 0.01 to 3 microns, preferably 0.1 to 2 microns. This is connected with the amount of scattered light from light incident on the fastener becoming high. It is undesirable for the dispersed particle diameter to be less than 0.01 microns or more than 3 microns, since then the resin composition will be dyed to a darker color than the cloth in the case that the resin composition is dyed in the same bath as the cloth. Moreover, the content of the polymer (B) is 1 to 30 parts by weight, preferably 2 to 25 parts by weight, particularly preferably 3 to 23 parts by weight, per 100 parts by weight of the polyester resin. It is undesirable for the content of the polymer (B) to be less than 1 part by weight, since then there will be insufficient scattered light, and moreover it is undesirable for the content of the polymer (B) to be more than 30 parts by weight, since then the color will conversely become too light, and moreover the wear resistance will drop.

Moreover, in the present invention, specific examples of the at least one inorganic compound (C) selected from the group consisting of titanium compounds, zinc compounds, and silicon compounds include titanium oxide, zinc oxide, zinc sulfide, talc, clay, silica, wallastonItemica, bentonite or the like. In particular, it is preferable to use titanium oxide, zinc oxide or zinc sulfide, which have a large effect of masking the coloring due to a dye, whereby the appearance can be made to be such that the resin composition is dyed the same color as clothing or the like. A combination of titanium oxide and talc is especially preferable, since then effects can be obtained by adding only a small amount. The content of the inorganic compound (C) is 0.1 to 10 parts by weight, preferably 0.1 to 7 parts by weight, particularly preferably 0.2 to 5 parts by weight, per 100 parts by weight of the polyester resin. It is undesirable for the content of the inorganic compound (C) to be less than 0.1 parts by weight, since then the resin composition will become a dark color when dyed in the same bath as cloth; moreover, if the content of the inorganic compound (C) is more than 10 parts by weight, then depth in the color tone will be lost and the wear resistance will drop, which is undesirable for a fastener. Moreover, as the form of the inorganic compound (C), a granular powder, a tabular powder or the like is preferable.

Examples of the fibrous reinforcing material (D) used in the present invention include inorganic fibers such as glass fibers, carbon fibers, acicular wallastonite, and whiskers of calcium titanate, aluminum borate or the like, and heat-resistant organic fibers such as aramid fibers and polyphenylene sulfide fibers. Glass fibers, acicular wallastonite, and aramid fibers are particularly preferable. The fiber diameter is preferably 1 to 30 microns, particularly preferably 10 to 20 microns. The fiber length is preferably 0.05 mm to 0.5 mm, more preferably 0.1 mm to 0.4 mm.

The content of the fibrous reinforcing material (D) is 0.1 to 200 parts by weight, preferably 0.5 to 150 parts by weight, particularly preferably 1 to 100 parts by weight, per 100 parts by weight of the polyester resin (A). It is undesirable for the content of the fibrous reinforcing material (D) to be less than 0.1 parts by weight, since there will be little effect of improving the strength and rigidity, or more than 200 parts by weight, since binding together of the fibrous reinforcing material (D) will become weak, and hence the resin composition will become brittle and the strength will drop.

The inorganic compound (C) and the fibrous reinforcing material (D) may be treated with a silane coupling agent, a titanate coupling agent or the like. Through such treatment, the strength and impact resistance of the formed article are improved. In particular, to improve the adhesion to the polyester resin, it is preferable for the inorganic compound (C) and the fibrous reinforcing material (D) to be treated with an epoxy type, acrylic type, urethane type, or amine type coupling agent.

The mold release agent (E) used in the present invention includes at least one selected from the group consisting of silicone compounds, higher fatty acid ester compounds, and higher fatty acid salt compounds. By including mold release agent (E), deformation upon release from the mold is prevented, and hence the dimensional accuracy is raised, and the engagement of the elements and the slider is improved, and thus smooth opening and closing becomes possible. In particular, these mold release agents have a suitable incompatibility toward a polyalkylene terephthalate, and hence the mold releasing effect is high, and moreover the heat resistance is high. Furthermore, these mold release agents are preferable since bleeding, blotching, unevenness in dyeing and so on are suppressed, and hence the external appearance is good and thus the merchandizability is not spoiled.

Specific examples of the mold release agent (E) include dimethyl siloxane compounds, methyl phenyl silicone compounds, alcohol-, epoxy- or acid-modified single-terminal- or both-terminal-reactive silicone oils, stearic acid esters, sodium stearate, calcium stearate, magnesium stearate, zinc stearate, calcium montanoate, montanoic acid esters, sodium montanoate, and partial salts of montanoic acid esters; of these, dimethyl siloxane compounds, alcohol-modified silicone oils, montanoic acid esters, calcium montanoate, and partial salts of montanoic acid esters are preferable. The content of the mold release agent is 0.1 to 10 parts by weight, preferably 0.1 to 8 parts by weight, particularly preferably 0.2 to 5 parts by weight, per 100 parts by weight of the polyester resin. It is undesirable for the content of the mold release agent to be less than 0.1 parts by weight, since then there will be little effect of preventing deformation upon release from the mold, or more than 10 parts by weight, since then bleeding, blotching, and unevenness in dyeing will occur on the surface of the molded article.

In the invention of Item 4 above, the flexural modulus of elasticity at 23° C. is at least 2.6 GPa, preferably at least 3.0 GPa. If the flexural modulus of elasticity is less than 2.6 GPa, then deformation will occur through the opening/closing resistance and the force acting upon a slippage-preventing autolock, and hence practical use will not be possible. Note that the value of the flexural modulus of elasticity is the value obtained in accordance with ASTM D790.

In particular, it is preferable for the slider material to be harder than the element material and thus to have a flexural modulus of elasticity of at least 3.0 GPa. In particular, at least 5.0 GPa is preferable for the pin and spring part of an autolock slider. If the hardness is too high then the elements will be worn, and hence it is preferable for the slider to have a flexural modulus of elasticity of not more than 7 GPa. In the case of using a glass fiber reinforcing material as the fibrous reinforcing material (D), it is preferable for the glass fiber content to be less than 20 wt %. With a fiber-reinforced resin composition having high dimensional accuracy according to the present invention, the objects of the present invention can be attained at not more than 7 GPa.

Note that in the case of a polybutylene terephthalate type resin having a low flexural modulus of elasticity, to make the flexural modulus of elasticity at least 2.6 GPa, it is necessary to carry out reinforcement by including a large amount of the fibrous reinforcing material. Consequently, in the present invention, by using a polyethylene terephthalate type resin having a relatively high flexural modulus of elasticity, the amount required of the reinforcing material can be made low, and hence a polyethylene terephthalate type resin is preferable as the polyester resin (A).

With the present invention, in addition to components (A) to (E) described above, commonly used additives such as heat stabilizers, weather-resisting agents, hydrolysis-resisting agents, and pigments can be added. Examples of heat stabilizers include hindered phenol compounds, thioether compounds, phosphite compounds, and combinations thereof. Examples of weather-resisting agents include carbon black, benzophenone compounds, triazole compounds, hindered amine compounds, or the like. Examples of hydrolysis-resisting agents include carbodiimide, bis-oxazoline, epoxies, and isocyanate compounds. As pigments, heat-resistant pigments commonly used with polyalkylene terephthalate type polymers can be used.

Moreover, sliders, elements, stoppers and slide fasteners obtained from the composition of the present invention can be used after having been dyed. In particular, if dyed under the same conditions as cloth, then the fastener obtained will have a color tone close to that of the cloth, and hence this is preferable in the case that sliders, elements, stoppers or slide fasteners having a color tone similar to that of the cloth are required An example of a method of dyeing under the same conditions as the cloth is a method in which the sliders, elements, stoppers and slide fasteners are dyed in the same bath as the cloth. The sliders, elements, stoppers and slide fasteners can be dyed after having been sewn onto the cloth, and hence compared with the case that the sliders, elements, stoppers and slide fasteners are dyed before being sewn on, the dyer can carry out the dying as required, which is useful for merchandise. As the dye, various types of dye can be used, and a disperse dye is preferable. Examples of disperse dyes are quinone type disperse dyes, azo type disperse dyes, and anthraquinone type disperse dyes. Dyeing auxiliaries such as leveling agents can be added. Moreover, in the case that the cloth is made of a polyester, material recycling can be carried out without separating the slide fasteners from the cloth, and hence the demands of a circulatory society can be responded to.

The resin composition for slide fasteners of the present invention can be manufactured by kneading together the various constituent components described above using an apparatus such as a single-screw extruder, a twin-screw extruder, a kneader, or the like. There are no particular limitations on the type of the kneading apparatus or the kneading conditions used.

Moreover, the slider, elements and slide fastener of the present invention are manufactured by a method such as forming the resin composition for slide fasteners described above. There are no particular limitations on the forming method, and an injection molding is generally used The mold temperature is preferably in a range of 30 to 60° C. or 120 to 150° C. There are no particular limitations on the shape of the slide fastener.

Moreover, the resin composition used for the slider of the present invention preferably has a flexural modulus of elasticity of 2.6 to 20.0 GPa, more preferably 3.5 to 15.0 GPa. A resin composition of flexural modulus of elasticity 4.0 to 10.0 GPa is particularly preferable. The resin composition used for the elements of the present invention preferably has a flexural modulus of elasticity of 1.5 to 5.0 GPa, more preferably 2.0 to 10.0 GPa. Furthermore, the resin composition used for stoppers preferably has a flexural modulus of elasticity of 2.0 to 10.0 GPa, more preferably 2.0 to 5.0 GPa.

A resin composition of the present invention can be used for any of the sliders, elements and stoppers that constitute slide fasteners. It is thus possible to manufacture a slide fastener that is completely made of resin. In particular, the resin composition of Item 3 described above is excellent in terms of flowability during molding and surface smoothness, and can be dyed to a similar color tone to that of the tape parts, and thus is suitable for elements. Moreover, the resin compositions of Items 4 and 5 described above have high strength and rigidity, and have good workability, and hence a molded article having good dimensional accuracy can be manufactured, and thus these resin compositions are suitable for sliders. In particular, a combination of the elements of Item 9 described above and the slider of Item 6 or 7 described above, which is slightly harder than the elements, has excellent wear resistance, and is thus preferable. Here, the hardness of the slider (the R-scale Rockwell hardness) is preferably higher than the hardness of the elements, and is preferably 100 to 125. Note that the value of the hardness is the value measured using the test method of ISO2039-2. Moreover, in the case of molding stoppers using an injection molding method according to which a high strength and a good external appearance can be obtained, it is preferable to use the resin composition of Item 5 described above.

Moreover, the slide fastener components such as sliders, elements and stoppers can be colored by a pre-dyeing method in which a pigment is mixed into the molding material, or by coating.

Furthermore, the resin composition, slider and elements of the present invention can be used in various types of slide fastener, and the slide fastener of the present invention encompasses various types of slide fastener. Examples of the slide fastener include coil fasteners in which the elements are a monofilament, and resin injected fasteners.

Moreover, with textile products that include an all-resin fastener that is made possible by the present invention, because piece-dyeing using the same bath is possible, undyed products can be gathered together and then dyed after production in accordance with the diversity of demand before being sold, and hence stock management becomes easy. Moreover, when textile products with which the present invention has been used are recycled and used as resin formed articles, it is possible to carry out melt-molding without separating the fasteners from the cloth.

Moreover, because the textile and the fastener are the same material, the dispersibility is good and does not become a shortcoming in terms of material properties, and hence not only chemical recycling but also material recycling is possible, and the recycled material can be used once again with the present invention.

Figure 1:
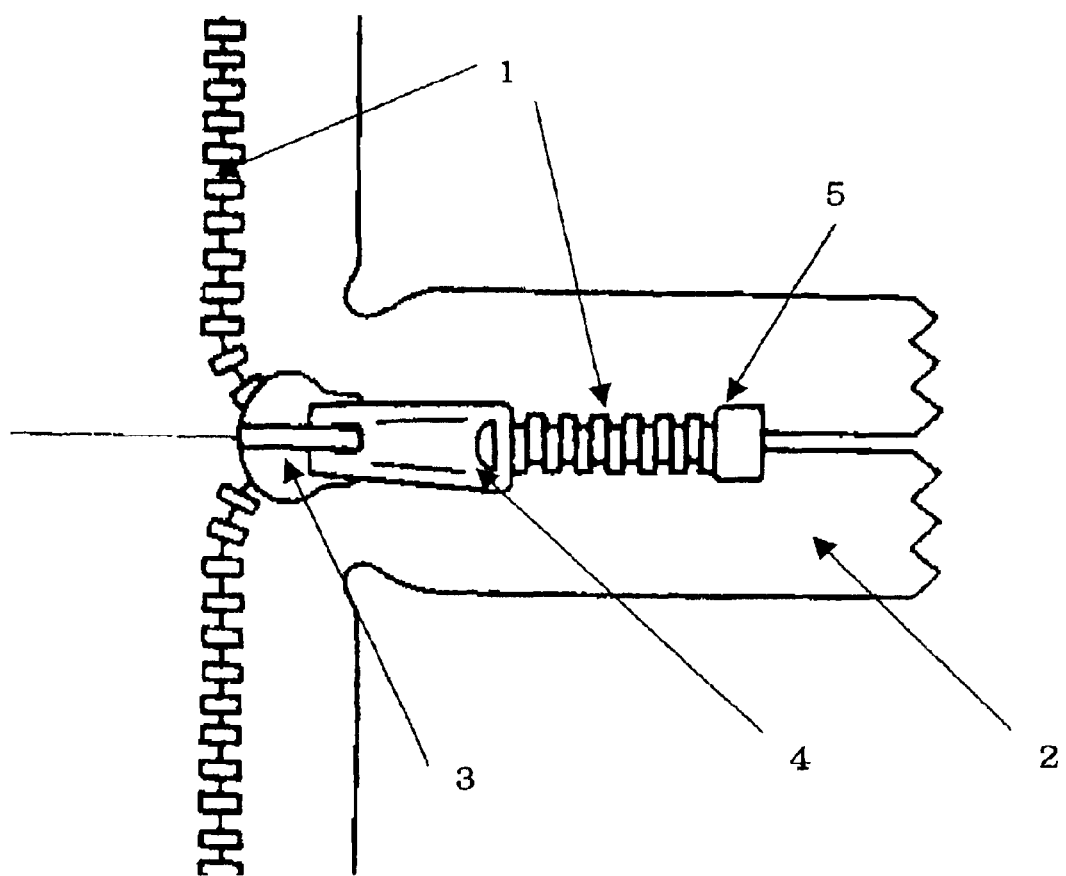
FIG. 1 is a drawing showing a form of a slide fastener.

The meanings of the reference numerals in the drawings are as follows.ps
1: Elements
2: Fastener tape
3: Slider body
4: Tab
5: Bottom stopper
6: Slider (comprises slider body 3 and tab 4)
7: Fixture

DESCRIPTION OF THE PREFERRED EMBODIMENTS

Following is a concrete description of the present invention through examples; however, the present invention is not limited to these examples. Note that the evaluation of material properties in the examples was carried out using the following methods.

1) Same bath dyeability: The pelletized material of the present invention was dried for 3 hours at 140° C., and was then fed into the hopper of an injection molding machine for which the cylinder temperatures had been adjusted to 255, 265 and 265° C., and injection molding was carried out onto tapes using 100 element molds on each side of length 35 cm for which the surface temperature had been adjusted to 40° C., thus obtaining a taped fastener. Moreover, a slider and a stopper were similarly molded, and a slide fastener as shown in FIG. 1 was formed. The taped fastener and the slide fastener were subjected to heat treatment at 130° C. for 20 minutes, thus obtaining evaluation samples. A die-cast zinc slider was used as the slider of the taped fastener.

20 g of the taped fastener was immersed in 1000 cc of a dyeing liquid containing 2% of Sumikaron SE-RPD navy blue dye (made by Sumitomo Chemical Co., Ltd.), and treatment was carried out at 130° C. for 30 minutes. After washing with water, air drying was carried out, thus completing the dyeing. The slide fastener was similarly dyed.

Using a color difference meter (model TC1500MC-88 made by Tokyo Denshoku), the values L1, a1 and b1 for the tape part of the taped fastener, and the values L2, a2 and b2 for the element part, which had been closed together using the slider, were measured, and the color difference ($\Delta E$) was calculated from the following formula. The same bath dyeability was evaluated from $\Delta E$.

$$\Delta E = [(L1-L2)^2 + (a1-a2)^2 + (b1-b2)^2]^{1/2}$$

Moreover, similarly, the values L1, a1 and b1 for the tape part of the slide fastener, and the values L2, a2 and b2 for the slider part, which had been closed together using the slider, were measured, and the same bath dyeability was evaluated from $\Delta E$.

2) Back-and-forth opening/closing durability 1: For the above-mentioned taped fastener, using a die-cast zinc slider, the durability was evaluated using a back-and-forth durability test (JIS S3015, paragraph 6.9) through whether or not there was sliding resistance or breakage after opening and closing 10,000 times.

3) Lateral pulling strength of chain: For the above-mentioned taped fastener, according as with JIS S3015, a 25 mm width of the tapes in a state with the elements closed was clamped from each side in a Tensilon UTM1 (made by Orientech), pulling was carried out at a pulling speed of 300 mm/min, and the maximum strength at which breakage occurred was measured.

4) Flexural modulus of elasticity: Using an injection molding machine set such that the molten resin temperature was 270° C. and a mold for which the surface temperature had been adjusted to 50° C., a strip of thickness 6.4 mm×width 12.7 mm×length 127 mm was injection molded using an edge gate with an injection time of 15 seconds and a cooling time of 15 seconds, and then heat treatment was carried out at 140° C. for 1 hour, thus obtaining a flexural test piece.

The test piece was stored for 20 hours in a laboratory at 23° C. and RH 50%, and then a flexural test was carried out according as with ASTM D790 using a universal tensile testing machine with the span length set to 100 mm and the cross-head speed set to 3 mm/min, and the flexural modulus of elasticity was calculated.

Figure 2:
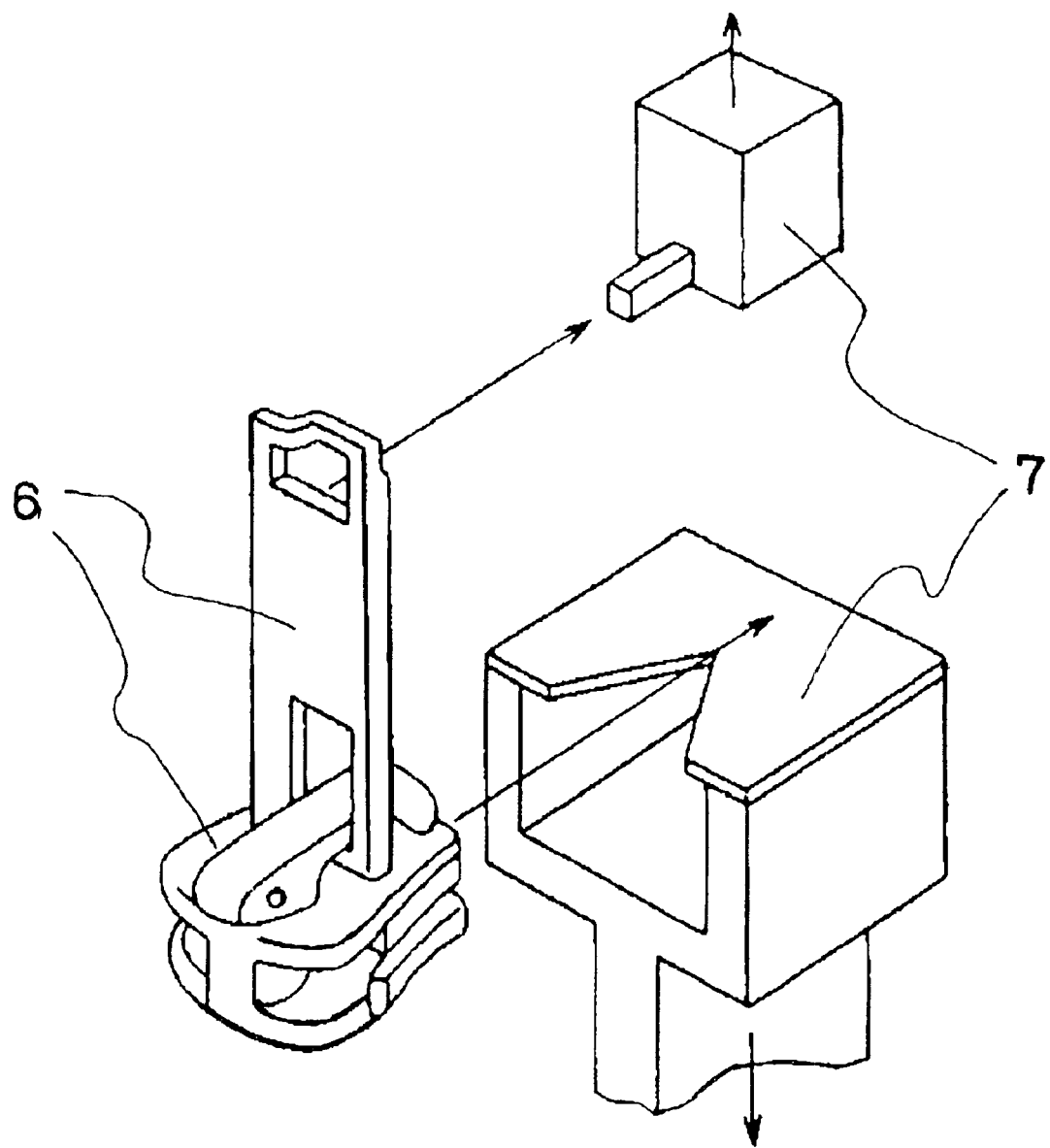
FIG. 2 is a drawing showing a form of a slider.

5) Back-and-forth opening/closing durability 2: With the slide fastener constitution shown in FIG. 1, a slider of the shape shown in FIG. 2 and elements obtained through injection molding and heat treatment using the resin composition of each Example were combined, and using a back-and-forth durability test (JIS S3015, paragraph 6.9), evaluation was carried out through whether or not there was sliding resistance or breakage after opening and closing 10,000 times.

◯: Breakage or increase in resistance is not found,
×: Breakage or increase in resistance is found

EXAMPLES A1 TO A11, AND COMPARATIVE EXAMPLES A1 TO A8

A combination of raw materials was selected from the resins, modified resins and inorganic fillers shown in Tables 1 and 2, and after weighing out the prescribed amounts (% by weight), preliminary mixing was carried out. Each of the resulting preliminary mixtures was put into the hopper of a unidirectional twin-screw extruder having a diameter of 30 mm and having cylinder temperatures adjusted to 265, 270 and 270° C. respectively from the hopper side, and melt-kneading was carried out at a screw rotational speed of 100 rpm, thus obtaining pellets. The pellets obtained were dried at 140° C. for 3 hours, thus obtaining evaluation samples. The properties were evaluated using the evaluation methods described above. The results are shown in Tables 1 and 2.

Note that the dispersed particle diameter of the polymer in the polyester resin was calculated by carrying out vacuum metalizing of gold onto the impact ruptured surface of an injection molded Izod impact test piece, and observing at a magnification of 3000× using a scanning electron microscope.

TABLE 1

|  |  | Example | | | | | | | | | | |
|---|---|---|---|---|---|---|---|---|---|---|---|---|
|  |  | A1 | A2 | A3 | A4 | A5 | A6 | A7 | A8 | A9 | A10 | A11 |
| Component (parts by weight) | PET 1 | 100 | 100 | 100 | 100 | 100 | 100 | 100 | 100 |  | 100 | 100 |
|  | PET 2 |  |  |  |  |  |  |  |  | 100 |  |  |
|  | M-S | 5 |  |  |  | 5 | 5 | 5 | 5 | 5 | 10 |  |
|  | PEL |  | 5 |  |  |  |  |  |  |  |  | 20 |
|  | E-NA |  |  | 5 |  |  |  |  |  |  |  |  |
|  | E-MA |  |  |  | 5 |  |  |  |  |  |  |  |
|  | EPM | 0.5 | 0.5 | 0.5 | 0.5 |  |  |  | 0.5 | 0.5 | 1 | 2 |
|  | ZnS |  |  |  |  | 0.5 |  |  |  |  |  |  |
|  | MW |  |  |  |  |  | 1 |  | 1 | 1 | 2 | 4 |
|  | VM8 |  |  |  |  |  |  | 1 |  |  |  |  |
| Mean dispersed particle diameter (microns) |  | 0.5 | 0.3 | 0.3 | 1.2 | 0.6 | 0.5 | 0.5 | 0.6 | 07 | 1.1 | 0.9 |
| ΔE |  | 2.2 | 2.8 | 2.9 | 1.8 | 2.7 | 3.7 | 4.1 | 1.6 | 1.5 | 1.2 | 1.9 |
| Lateral pull strength (N) |  | 453 | 477 | 425 | 444 | 475 | 482 | 454 | 449 | 419 | 404 | 401 |
| Opening/closing durability 1 |  | ◯ | ◯ | ◯ | ◯ | ◯ | ◯ | ◯ | ◯ | ◯ | ◯ | ◯ |

TABLE 2

|  |  | Comparative Example | | | | | | | |
|---|---|---|---|---|---|---|---|---|---|
|  |  | A1 | A2 | A3 | A4 | A5 | A6 | A7 | A8 |
| Component (parts by weight) | PET 1 | 100 | 100 | 100 | 100 | 100 | 100 | 100 | 100 |
|  | PET 2 |  |  |  |  |  |  |  |  |
|  | M-S |  |  |  |  |  |  |  |  |
|  | PEL |  | 5 |  | 5 | 5 | 5 |  |  |
|  | E-NA |  |  |  |  |  |  |  |  |
|  | E-MA |  |  |  |  |  |  |  | 40 |
|  | EPM |  |  | 0.5 | 0.5 | 0.05 |  | 15 |  |
|  | ZnS |  |  |  |  |  |  |  |  |
|  | MW |  |  |  |  | 0.05 |  |  |  |
|  | VM8 |  |  |  |  |  |  |  |  |
| Mean dispersed particle diameter (microns) |  | — | 0.5 | — | 0.2 | 0.6 | 0.5 | — | 2.7 |

TABLE 2-continued

|  | Comparative Example | | | | | | | |
|---|---|---|---|---|---|---|---|---|
|  | A1 | A2 | A3 | A4 | A5 | A6 | A7 | A8 |
| ΔE | 21.1 | 12.7 | 11.6 | 10.1 | 11.1 | 12.2 | 3.3 | 4.5 |
| Lateral pull strength (N) | 322 | 353 | 297 | 366 | 389 | 396 | 173 | 144 |
| Opening/closing durability 1 | X | X | X | X | X | X | X | X |

The abbreviations in Tables 1 and 2 have the following meanings.
PET1: Re-pelletized material from recovered PET bottles (made by YPR (Yono Pet Bottle Recycling))
PET 2: VYLOPET EMC500-01 (made by Toyobo Co., Ltd.)
EPM: Titanium oxide (made by Sumika Color Co., Ltd.)
ZnS: Zinc sulfide (Sachtolith HD, made by Sachtleben)
MW: Talc #5000A (made by Hayashi Kasei)
VM8: Wallastonite (made by Hayashi Kasei)
E-MA: Maleic-anhydride-modified polyethylene (Nucrel N410, made by Mitsui Chemicals Co., Ltd.)
E-NA: Ionomer (Himilan 1707, made by Mitsui Chemicals Co., Ltd.)
M-S: MBS type rubber (Metablen S2001, made by Mitsubishi Rayon Co., Ltd.)
PEL: Polyester type elastomer (GP100, made by Toyobo Co., Ltd.)

EXAMPLES B1 TO B11, AND COMPARATIVE EXAMPLES B1 TO B8

A combination of raw materials was selected from the resins, modifiers and inorganic fillers shown in Tables 3 and 4, and after weighing out the prescribed amounts (% by weight), preliminary mixing was carried out. Each of the resulting preliminary mixtures was put into the hopper of a unidirectional twin-screw extruder having a diameter of 30 mm and having cylinder temperatures adjusted to 265, 270 and 270° C. respectively from the hopper side, and melt-kneading was carried out at a screw rotational speed of 100 rpm, thus obtaining pellets. The pellets obtained were dried at 140° C. for 3 hours, thus obtaining evaluation samples. The properties were evaluated using the evaluation methods described above. The results are shown in Tables 3 and 4.

TABLE 3

| | | Example | | | | | | | | | | | |
|---|---|---|---|---|---|---|---|---|---|---|---|---|---|
| | | B1 | B2 | B3 | B4 | B5 | B6 | B7 | B8 | B9 | B10 | B11 | B12 |
| Component (parts by weight) | PET 1 | 100 | 100 | 100 | 100 | 100 | 100 | | | 100 | 100 | 100 | |
| | PET 2 | | | | | | | 100 | | | | | 100 |
| | PBT | | | | | | | | 100 | | | | |
| | POM | | | | | | | | | | | | |
| | E-MA | | | | | 5 | | | | | | | |
| | PEL | | | | | | 5 | | | | | | |
| | Glass fiber | 18 | 40 | 80 | 5 | 15 | 15 | 18 | 18 | | 10 | 30 | 18 |
| | Whisker | | | | | | | | | 50 | | | |
| | SIO | | | | | | | | | | | | 0.5 |
| | WAX | 0.5 | 0.5 | 0.5 | 0.5 | 0.5 | 0.5 | 0.5 | 0.5 | 0.5 | 0.5 | 0.5 | |
| | MW | | | | | | | | | | 3 | 10 | |
| | ZnS | 1 | 1 | 1 | 1 | 1 | 1 | 1 | 1 | 1 | 1 | 1 | 1 |
| Material properties | Bending modulus of elasticity (GPa) | 7.3 | 9.2 | 13.7 | 3.5 | 4.1 | 4.3 | 7.5 | 5.7 | 8.8 | 5.5 | 7.8 | 7.3 |
| | Slider joining strength (N) | 122 | 145 | 153 | 102 | 137 | 142 | 130 | 119 | 109 | 106 | 131 | 132 |
| | Opening/closing durability 2 | ○ | ○ | ○ | ○ | ○ | ○ | ○ | ○ | ○ | ○ | ○ | ○ |
| | ΔE | 2.4 | 2.4 | 2.3 | 2.8 | 1.7 | 2.1 | 2.1 | 2.9 | 1.8 | 2.3 | 2.0 | 2.2 |

TABLE 4

| | | Comparative Example | | | | | | | |
|---|---|---|---|---|---|---|---|---|---|
| | | B1 | B2 | B3 | B4 | B5 | B6 | B7 | B8 |
| Component (parts by weight) | PET 1 | 100 | 100 | 100 | | | | | 100 |
| | PET 2 | | | | | | | | |
| | PBT | | | | 100 | 100 | 100 | | |
| | POM | | | | | | | 100 | |
| | E-MA | | 10 | 25 | | | | | |
| | PEL | | | | 10 | | | | |
| | Glass fiber | | | | | | 3 | | 18 |
| | Whisker | | | | | | | | |
| | SIO | | | | | | | | |
| | WAX | | | | | | | | |

TABLE 4-continued

|  |  | Comparative Example | | | | | | | |
| --- | --- | --- | --- | --- | --- | --- | --- | --- | --- |
|  |  | B1 | B2 | B3 | B4 | B5 | B6 | B7 | B8 |
|  | MW |  |  |  |  | 10 |  |  |  |
|  | ZnS | 1 | 1 | 1 | 1 | 1 | 1 | 1 | 1 |
| Material properties | Bending modulus of elasticity (GPa) | 2.1 | 1.6 | 2.3 | 2.3 | 2.5 | 2.4 | 2.5 | 7.3 |
|  | Slider joining strength (N) | 62 | 50 | 67 | 70 | 66 | 73 | 99 | 66 |
|  | Opening/closing durability 2 | X | X | X | X | X | X | X | X |
|  | ΔE | 2.7 | 1.9 | 2.8 | 3.3 | 3.0 | 2.8 | >50 | 2.5 |

The abbreviations in Tables 3 and 4 have the following meanings.
PET1: Re-pelletized material from recovered PET bottles (made by YPR (Yono Pet Bottle Recycling))
PET 2: Polyethylene terephthalate, VYLOPET EMC500-01 (made by Toyobo Co, Ltd.)
PBT: Polybutylene terephthalate, VYLOPET EMC700 (made by Toyobo Co, Ltd.)
POM: Polyoxymethylene, Duracon M90S (made by Polyplastics Co, Ltd.)
Glass fibers: 03JA429 (made by Asahi Fiber Glass Co.)
Whiskers: Potassium hexatitanate, Tismo-D (made by Otsuka Chemical Co, Ltd.)
SIO: Silicone oil, TSF451 (made by Toshiba Silicones)
WAX: Montanoic acid ester partial calcium salt, WAXOP (made by Clariant)
MW: Talc #5000A (made by Hayashi Kasei)
E-MA: Maleic-anhydride-modified polyethylene (Nucrel N410, made by Mitsui Chemicals Co., Ltd.)
PEL: Polyester type elastomer (GP100, made by Toyobo Co., Ltd.)
ZnS: Zinc sulfide, Sachtolith HD (made by Sachtleben)

Industrial Applicability

According to the resin composition, slider and elements of the present invention, by using a conventional method of dying cloth, the resin composition, slider or elements can be dyed to a color tone similar to that of the cloth. Moreover, the moldability, strength, heat resistance and durability are excellent. Furthermore, in the case that a slide fastener has been manufactured using the resin composition of the present invention, recycling can be carried out without separating the slide fastener from the cloth.

What is claimed is:

1. A resin composition for a slide fastener comprising undermentioned component (A) and at least one component selected from the group consisting of undermentioned components (B), (C), (D) and (E):
    (A) a polyester resin having at least 80 mol % of an alkylene terephthalate repeat unit;
    (B) a polymer having a mean dispersed particle diameter dispersed in a range of 0.01 to 3 microns and having a glass transition temperature of not more than 0° C.;
    (C) at least one inorganic compound selected from the group consisting of titanium compounds, zinc compounds, and silicon compounds;
    (D) a fibrous reinforcing material;
    (E) at least one mold release agent selected from the group consisting of silicone compounds, higher fatty acid ester compounds, and higher fatty acid salt compounds.
2. The resin composition for a slide fastener according to claim 1, wherein said alkylene terephthalate repeat unit is an ethylene terephthalate repeat unit.
3. The resin composition for a slide fastener according to claim 1, comprising 100 parts by weight of said (A), 1 to 30 parts by weight of said (B), and 0.1 to 10 parts by weight of said (C).
4. The resin composition for a slide fastener according to claim 2, comprising 100 parts by weight of said (A), 1 to 30 parts by weight of said (B), and 0.1 to 10 parts by weight of said (C).
5. The resin composition for a slide fastener according to claim 1, comprising said (A), said (D) and said (E), and having a flexural modulus of elasticity of at least 2.6 GPa at 23° C.
6. The resin composition for a slide fastener according to claim 2, comprising said (A), said (D) and said (E), and having a flexural modulus of elasticity of at least 2.6 GPa at 23° C.
7. The resin composition for a slide fastener according to claim 5, comprising 100 parts by weight of said (A), 0.1 to 200 parts by weight of said (D), and 0.1 to 10 parts by weight of said (E).
8. The resin composition for a slide fastener according to claim 6, comprising 100 parts by weight of said (A), 0.1 to 200 parts by weight of said (D), and 0.1 to 10 parts by weight of said (E).
9. A slider comprising a body and a tab having a resin composition comprising undermentioned component (A) and at least one component selected from the group consisting of undermentioned components (B), (C), (D) and (E):
    (A) a polyester resin having at least 80 mol % of an alkylene terephthalate repeat unit;
    (B) a polymer having a mean dispersed particle diameter dispersed in a range of 0.01 to 3 microns and having a glass transition temperature of not more than 0° C.;
    (C) at least one inorganic compound selected from the group consisting of titanium compounds, zinc compounds, and silicon compounds;
    (D) a fibrous reinforcing material;
    (E) at least one mold release agent selected from the group consisting of silicone compounds, higher fatty acid ester compounds, and higher fatty acid salt compounds.
10. The slider of claim 9 having a flexural modulus of elasticity of at least 2.6 GPa at 23° C. and having a resin composition comprising:
    (A) a polyester resin having at least 80 mol % of an alkylene terephthalate repeat unit,
    (D) a fibrous reinforcing material, and
    (E) at least one mold release agent selected from the group consisting of silicone compounds, higher fatty acid ester compounds, and higher fatty acid salt compounds.
11. The slider of claim 10, wherein said alkylene terephthalate repeat unit is an ethylene terephthalate unit.

12. The slider of claim 10, wherein said resin composition comprises 100 parts by weight of said (A), 0.1 to 200 parts by weight of said (D), and 0.1 to 10 parts by weight of said (E).

13. The slider of claim 11, wherein said resin composition comprises 100 parts by weight of said (A), 0.1 to 200 parts by weight of said (D), and 0.1 to 10 parts by weight of said (E).

14. A slide fastener element comprising teeth having a resin composition comprising undermentioned component (A); and at least one component selected from the group consisting of undermentioned components (B), (C), (D) and (E):

(A) a polyester resin having at least 80 mol % of an alkylene terephthalate repeat unit;

(B) a polymer having a mean dispersed particle diameter dispersed in a range of 0.01 to 3 microns and having a glass transition temperature of not more than 0° C.;

(C) at least one inorganic compound selected from the group consisting of titanium compounds, zinc compounds, and silicon compounds;

(D) a fibrous reinforcing material;

(E) at least one mold release agent selected from the group consisting of silicone compounds, higher fatty acid ester compounds, and higher fatty acid salt compounds.

15. The element according to claim 14, wherein said resin composition comprises 100 parts by weight of said (A), 1 to 30 parts by weight of said (B), and 0.1 to 10 parts by weight of said (C).

16. The element according to claim 15, wherein said alkylene terephthalate repeat unit is an ethylene terephthalate repeat unit.

17. A slide fastener having a slider comprising a body and a tab or an element comprising teeth, at least one of the slider or the element comprising undermentioned component (A) and at least one component selected from the group consisting of undermentioned components (B), (C), (D) and (E):

(A) a polyester resin having at least 80 mol % of an alkylene terephthalate repeat unit;

(B) a polymer having a mean dispersed particle diameter dispersed in a range of 0.01 to 3 microns and having a glass transition temperature of not more than 0° C.;

(C) at least one inorganic compound selected from the group consisting of titanium compounds, zinc compounds, and silicon compounds;

(D) a fibrous reinforcing material; and (E) at least one mold release agent selected from the group consisting of silicone compounds, higher fatty acid ester compounds, and higher fatty acid salt compounds.

18. The slide fastener according to claim 17, wherein the slide fastener comprises the slider and the element.

* * * * *